(12) United States Patent
Elisiussen

(10) Patent No.: US 8,112,239 B2
(45) Date of Patent: Feb. 7, 2012

(54) METHOD AND SYSTEM OF PERFORMING A FUNCTIONAL TEST OF AT LEAST ONE EMBEDDED SUB-ELEMENT OF A WIND TURBINE

(75) Inventor: Soren Elisiussen, Randers (DK)

(73) Assignee: Vestas Wind Systems A/S, Randers (DK)

( * ) Notice: Subject to any disclaimer, the term of this patent is extended or adjusted under 35 U.S.C. 154(b) by 238 days.

(21) Appl. No.: 12/487,226

(22) Filed: Jun. 18, 2009

(65) Prior Publication Data

US 2009/0259429 A1 Oct. 15, 2009

Related U.S. Application Data

(63) Continuation of application No. PCT/DK2007/000551, filed on Dec. 18, 2007.

(30) Foreign Application Priority Data

Dec. 18, 2006 (DK) .................. 2006 01660

(51) Int. Cl.
*G06F 19/00* (2006.01)
*F03D 11/00* (2006.01)
*G01M 19/00* (2006.01)

(52) U.S. Cl. ........................................ 702/113; 290/44

(58) Field of Classification Search .............. 702/2, 113, 702/188; 73/147, 168; 290/44; 415/4.1; 700/286, 287
See application file for complete search history.

(56) References Cited

U.S. PATENT DOCUMENTS

| 4,534,216 | A | * | 8/1985 | Fasano et al. ................ 73/147 |
| 6,975,925 | B1 | | 12/2005 | Barnes et al. |
| 7,403,854 | B1 | * | 7/2008 | Hurley et al. .................. 702/3 |
| 2004/0151578 | A1 | | 8/2004 | Wobben |
| 2005/0107989 | A1 | | 5/2005 | Henriksen et al. |
| 2006/0070435 | A1 | | 4/2006 | LeMieux et al. |
| 2006/0113801 | A1 | * | 6/2006 | Schubert et al. .............. 290/44 |
| 2006/0173623 | A1 | | 8/2006 | Grzych et al. |

FOREIGN PATENT DOCUMENTS

DE 20021970 U1 4/2001

(Continued)

OTHER PUBLICATIONS

International Preliminary Report on Patentability; PCT/DK2007/000551; May 5, 2009; 6 pages.

(Continued)

*Primary Examiner* — John H Le
(74) *Attorney, Agent, or Firm* — Patterson & Sheridan, LLP

(57) ABSTRACT

A method of performing a functional test of at least one embedded sub-element of a wind turbine, the wind turbine being controlled by a control algorithm of a wind turbine controller, includes the steps of: executing a predefined event pattern activating at least one sub-element of the wind turbine, obtaining measure data on the basis of measurements of at least one sub-element according to the predefined event pattern, and relating the measure data to predefined reference data and establishing a test result indicating the condition of the embedded sub-element on the basis thereof. The predefined event pattern is executed by a test algorithm overriding the control algorithm of the wind turbine controller at least partly. It is a very advantageous feature according to the present invention that the sub-elements may be tested while being embedded in the wind turbine.

15 Claims, 7 Drawing Sheets

FOREIGN PATENT DOCUMENTS

| | | | |
|---|---|---|---|
| EP | 1564405 | A1 | 8/2005 |
| JP | 3238376 | A | 10/1991 |

OTHER PUBLICATIONS

International Search Report; PCT/DK2007/000551; Oct. 14, 2008; 3 pages.

Pinson P et al: "Wind Power Forecasting Using Fuzzy Neural Networks Enhanced With On-Line Prediction Risk Assessment" Proceedings of IEEE Power Tech Conference, XX, XX, Jun. 23, 2003, p. 8PP, XP008074043.

\* cited by examiner

METHOD AND SYSTEM OF PERFORMING A FUNCTIONAL TEST OF AT LEAST ONE EMBEDDED SUB-ELEMENT OF A WIND TURBINE

CROSS-REFERENCE TO RELATED APPLICATIONS

The present application is a continuation of pending International patent application PCT/DK2007/000551 filed on Dec. 18, 2007 which designates the United States and claims priority from Danish patent application PA 2006 01660 filed on Dec. 18, 2006, the content of which is incorporated herein by reference.

FIELD OF THE INVENTION

The invention relates to a method of performing a functional test of at least one embedded sub-element of a wind turbine being controlled by a control algorithm of a wind turbine controller.

BACKGROUND OF THE INVENTION

The strategically distributed nature of wind power presents unique challenges. A wind park comprises several wind turbines and is often located offshore, and often covers large geographic areas.

The prior art presents several ways of remote controlling and monitoring of wind turbines and wind parks. U.S. Pat. No. 6,966,754 teaches a method and system for monitoring wind turbines, by means of image and acoustic monitoring. This is an example of a wind turbine to control itself on the basis of dynamical measurement of factors within the wind turbine.

In relation to testing or trouble shooting sub-elements of a wind turbine, prior art teaches a system referred to as a test bench. European patent EP 1564405 discloses such a test bench for wind turbines comprising a test bed on which the element to be tested is mounted for a test and error detection.

SUMMARY OF THE INVENTION

The invention relates to a method of performing a functional test of at least one embedded sub-element of a wind turbine,
    said wind turbine being controlled by a control algorithm of a wind turbine controller,
    said method comprising the steps of
        executing a predefined event pattern activating at least one sub-element of the wind turbine,
        obtaining measure data on the basis of measurements of at least one sub-element according to said predefined event pattern,
        relating said measure data to predefined reference data,
        and establishing a test result indicating the condition of said embedded sub-element on the basis thereof,
    wherein said predefined event pattern is executed by a test algorithm overriding the control algorithm of the wind turbine controller at least partly.

It is a very advantageous feature according to the present invention that the sub-elements may be tested while being embedded in the wind turbine. This fact will save the operator or the service mechanic dismounting and transportation of sub-elements which is very time consuming. In accordance with a preferred embodiment of the present invention it is possible to test sub-elements while they are still mounted as a part of the wind turbine.

The term control algorithm is understood as the algorithm or logic controlling the wind turbine under normal operation, i.e. when the wind turbine produces power. The control algorithm is typically executed by a wind turbine controller.

The relating of measure data to predefined reference data is another very advantageous feature of an embodiment of the invention. The predefined reference data typically set out expected or intended data. These data may e.g. by established by means of test on representative sub-elements tested from factory. The data may also be applied as a reference to previous acceptable data which may be deviated from to a certain degree.

In an embodiment of the invention it is possible for the test unit performing the test to contact and control one individual sub-element of a wind turbine while bypassing or overriding the internal control logic of the wind turbine in the sense that the test logic takes over for a short while. It is noted that the test logic may form a separate circuitry than the control logic but typically may be implemented by a test algorithm executed by the control algorithm(s) of the wind turbine controller.

An embedded sub-element to be tested may according to an embodiment of the invention be understood as any element that functions in relation to a wind turbine, in particular elements forming parts of the wind turbine such as generator, hub, pitch system, blades, yaw, specific relevant actuators, structural parts of the wind turbine. etc. When the wind turbine produces energy the sub-element is a necessary element of the wind turbine, but when the wind turbine is to be tested, the sub-elements may, according to an embodiment of the invention, be seen as a group of test elements, a group of activation elements and a group of measuring elements as explained in more detail with reference to FIG. 9 of the detailed description.

The sub-element may e.g. be a valve, a piston, cylinder or a meter of the wind turbine, but may also be elements of the control station of a wind park e.g. to detect errors in the power output equipment.

An activation element, i.e. an element by which the test is to be performed may e.g. comprise an actuator or a part of the wind turbine which may be actuated by means of the test algorithm.

It should be noted that the test algorithm to a certain degree may refer to or apply the control algorithm of the wind turbine controller if such implementation offers the same ability to use an activation element both under normal use according to the control algorithms setting out the normal operation and under test conditions where the activation element may operate under different conditions due to the fact that the wind turbine in question is at least partly shut-down.

According to an embodiment of the invention, the execution of a predefined event pattern comprises the execution of a predefined number of events in a predefined order according to a test algorithm.

It is noted that the embedded element and the activation element under some circumstances may be the same element or be mutually integrated.

According to an embodiment of the invention, the functional test is established on the basis of a controlled activation of activation elements.

The wind turbine and thereby the sub-elements may be controlled by more than one algorithm. During ordinary operation of the wind turbine the sub-elements are controlled by the wind turbine controller (the control algorithm). During test operation of the wind turbine according to an embodiment of the present invention, where individual embedded sub-elements may be tested, at least part of the sub-elements are controlled by a test algorithm which bypasses the wind turbine control logic.

One important feature of the invention is to at least partly enable the test algorithm to bypass the wind turbine control logic. Because of this feature the test algorithm may control the sub-elements into operations which otherwise is not possible and thereby increasing the variety of possible tests on the wind turbine not available during normal operation.

A non-limiting example may be the blade pitch control, which under normal operation of the wind turbine is controlled by the wind turbine control logic and used to control the angle of the blades against the wind, to ensure maximum utilization of the wind without damaging sub-elements of the wind turbine. During test operation of the wind turbine it may be convenient to force the blade pitch control to pitch the blades into angles which the wind turbine control logic would not allow. By having the blade pitched into relative extreme angles it may be possible to observe reactions in other sub-elements such as blades or the main shaft in the wind turbine. This is one out of many examples of a test which is only possible due to the advantageous overriding of the normal control algorithm which is performed by the test algorithm according to an embodiment of the present invention.

It is very advantageous to implement an embodiment of the present invention in a wind turbine located in a wind power plant. This allows the park administrator to take each individual wind turbine out of normal operation and perform a test on the wind turbine as such or a part of the wind turbine.

Typically when performing the functional test, the wind turbine pauses the normal energy producing operation.

In an embodiment of the invention, said embedded sub-element of the wind turbine is a test element.

In an embodiment of the invention, said activating of at least one sub-element of the wind turbine involves activation of an activation element of the wind turbine.

In an embodiment of the invention, said obtaining of measure data on the basis of measurements of at least one sub-element involves measuring performed by measuring element.

In an embodiment of the invention, said activation element comprises an actuator.

According to an advantageous embodiment of the invention the actuator may be used to transform an input signal to a controlled physical displacement or motion into one or more sub-elements or to clamp one or more sub-elements to prevent motions.

According to the present invention an actuator may e.g. be a sub-element, or any other activating elements AE which may be required to implement a functional test.

In an embodiment of the invention, said functional test is performed remotely with respect to the wind turbine.

In an embodiment of the invention, said execution of a predefined event pattern comprises the execution of a predefined number of events in a predefined order.

In an embodiment of the invention, said predefined event pattern bypasses the internal control logic related to the wind turbine.

In an embodiment of the invention, said test unit comprises test control logic that may override the operation logic of said wind turbine at least partly.

An embedded sub-element of a wind turbine is to be understood as an element that is comprised by a wind turbine or is related to a wind turbine. The fact that the sub-element is embedded while performing the test means that the sub-element is at least partly in its normal environment and does not need to be physically removed from the wind turbine while performing the test.

In an embodiment of the invention, said executing of a predefined event pattern and said obtaining of measure data are performed simultaneously.

In an embodiment of the invention, said functional test is performed by a test unit.

Moreover, the test of sub-elements may in accordance with the invention be performed from a remote distance. This is a further very advantageous feature of the invention, in that the operator may perform tests and find the accurate source of error before directing service personnel to the wind turbine site.

In an embodiment of the invention, said wind turbine under normal operation is controlled by a control algorithm and during functional test operation said wind turbine is at least partly controlled by a test algorithm according to said predefined event pattern.

In an embodiment of the invention, at least one activation element of said wind turbine, e.g. an actuator, is controlled by the test algorithm of said test unit.

Under normal operation of the wind turbine the activation element is controlled by the wind turbine controller of the wind turbine.

Moreover, the invention relates to a method of valuating at least one wind turbine comprising the steps of
  executing a predefined number of functional tests according to one or more of the above-described tests,
  generating a status report on the basis of said functional tests comprising a determination of the general condition of said at least one wind turbine.
  valuating said wind turbine on the basis of said status report.

Another benefit of the functional test of embedded sub-elements of a wind turbine in accordance with the present invention may be an execution of a predefined number of tests to establish a general status report in connection with the valuation, pricing and selling of a wind turbine. This status report may in one embodiment of the invention comprise a detailed thorough description of important parts of the wind turbine and a determination of the general condition of the wind turbine.

A status report generated according to the invention will certainly be of major importance when a wind turbine is priced in connection with a sale of wind turbines.

The status report may in a further embodiment of the present invention constitute a kind of status certificate. If a wind turbine is tested e.g. once every month, it may be possible to indicate to possible investors that the wind turbines of a company is in a very good condition. Or in the case of an investment trust are to gain new investors, it may be a convincing and reassuring factor if they invest in wind turbines with a status certificate according to the invention.

Furthermore, the invention relates to a system for performing a functional test of at least one embedded sub-element in a wind turbine,
  said wind turbine being controlled by a control algorithm of a wind turbine controller.
  said system comprising
  at least one wind turbine comprising at least one activation element,
  a test unit connected to said wind turbine via a data communication network,
  at least one activation element comprised by said wind turbine, wherein the activation element is controlled by the control algorithm of the wind turbine controller and wherein the activation element is controlled by a test algorithm during a functional test.

According to an advantageous embodiment of the invention the system may be used to test individual wind turbines in a wind power plant. According to the invention it is possible, from a remote location, to choose to test a specific wind turbine in a wind power plant while the rest of the wind turbines in the wind power park are producing energy.

In an embodiment of the invention, the control algorithm is at least partly overridden by said test algorithm while performing said functional test.

In an embodiment of the invention, said at least one relevant activation element, measuring element or test element is out of normal operation while performing said functional test.

In an embodiment of the invention, said data communication network is communicating through a public data communication network, e.g. the internet.

In accordance with a preferred embodiment of the invention, said activation elements may be a part of the wind turbine.

In an embodiment of the invention, said test unit is located at a remote distance from the wind turbine.

In an embodiment of the invention, said wind turbine is part of a wind power plant comprising at least two wind turbines.

In an embodiment of the invention, said activation element comprises an actuator.

In an embodiment of the invention, said embedded sub-element comprises an actuator or a part of the wind turbine structure.

Moreover, the invention relates to a method of establishing a predefined event pattern according to a functional test of at least one embedded sub-element of a wind turbine, said method comprising the steps of
selecting at least one test element to test,
selecting at least one activation element,
selecting at least one measuring element,
selecting reference data,
establishing an event pattern comprising a specific sequence definition of how to activate said at least one activation element, how to obtain measure data according to measurements of at least one measuring element, and how to correlate said measure data and said reference data to establish a test result.

It is a very advantageous feature of the invention that the tests are performed by means of using embedded sub-elements of a wind turbine to function test other embedded sub-elements of a wind turbine. This is done by execution of a predefined event pattern. The establishment of a predefined event pattern may be done by a predefined event patter establisher. This may be done in several ways, e.g. by means of a GUI (Grafical User Interface) to e.g. drag and drop elements, or by means of hard coding the test in a programming language to establish a test program or a test algorithm to be executed e.g. on the test unit.

Moreover, the invention relates to use of predefined event patterns to detect errors in embedded sub-elements of a wind turbine by means of a correlation of measure data and reference data.

BRIEF DESCRIPTION OF THE DRAWINGS

The invention will be described in the following with reference to the figures in which.

DETAILED DESCRIPTION OF THE INVENTION

Figure 1:
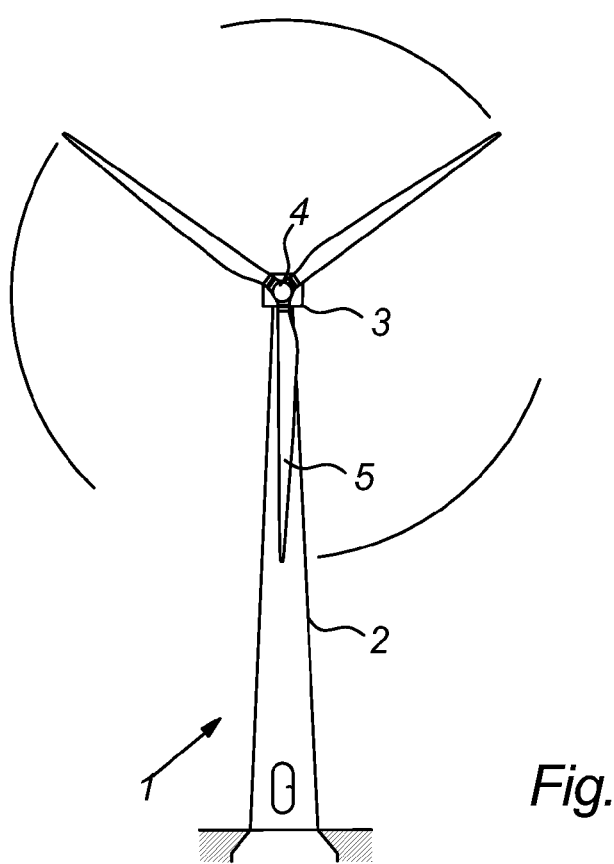
FIG. 1 illustrates a large modern wind turbine as seen from the front.

FIG. 1 illustrates a modern wind turbine 1. The wind turbine 1 comprises a tower 2 positioned on a foundation. A wind turbine nacelle 3 with a yaw mechanism is placed on top of the tower 2.

A low-speed shaft extends out of the nacelle front and is connected with a wind turbine rotor through a wind turbine hub 4. The wind turbine rotor comprises at least one rotor blade e.g. three rotor blades 5 as illustrated.

Figure 2:
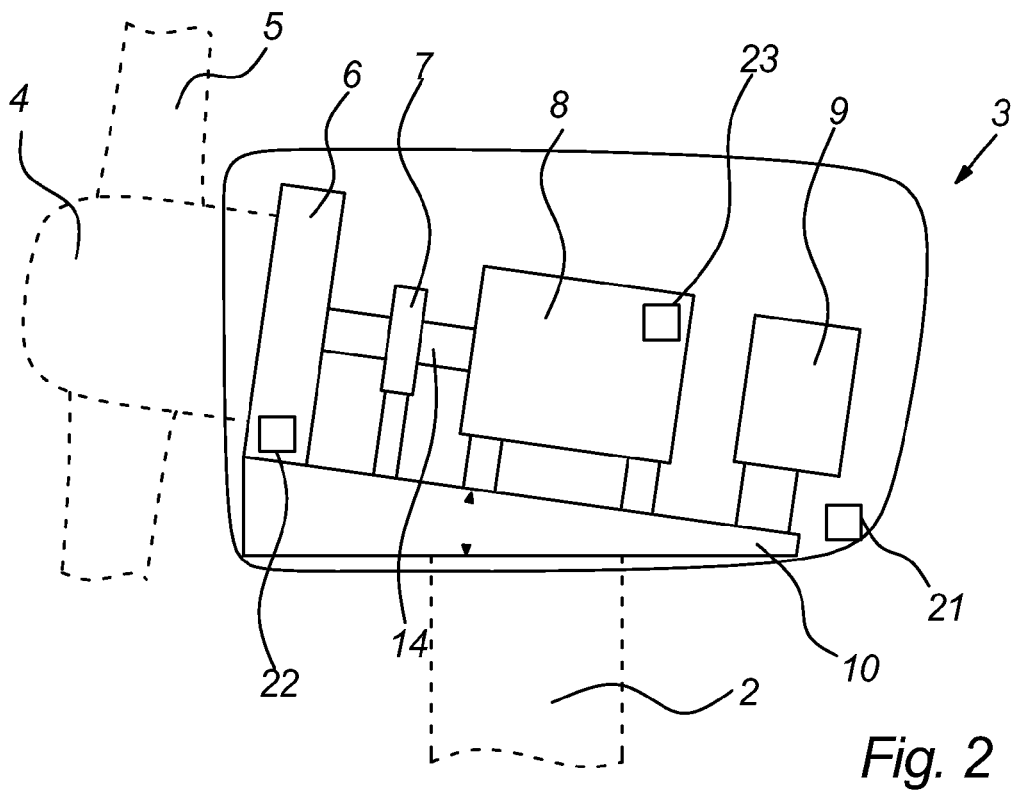
FIG. 2 illustrates a cross section of an embodiment of a simplified nacelle known in the art, as seen from the side.

FIG. 2 illustrates a simplified cross section of a nacelle 3, as seen from the side.

Nacelles 3 exist in a multitude of variations and configurations but in most cases the drive train 14 in the nacelle 3 almost always comprise one or more of the following components: a gear 6, a coupling (not shown), some sort of breaking system 7 and a generator 8. A nacelle 3 of a modern wind turbine 1 can also include a converter 9, an inverter (not shown) and additional peripheral equipment such as further power handling equipment, control systems, hydraulic systems, cooling systems and more.

The weight of the entire nacelle 3 including the nacelle components 6, 7, 8, 9 is carried by a load carrying structure 10. The components 6, 7, 8, 9 are usually placed on and/or connected to this common load carrying structure 10. In this simplified embodiment, the load carrying structure 10 only extends along the bottom of the nacelle 3 e.g. in form of a bed frame to which some or all the components 6, 7, 8, 9 are connected.

A typical wind turbine may further comprise a number of sensors or meters, e.g. vibration sensor 21, gear oil thermometer 22 and generator thermometer 23. It is noted that many other sensors and meters for measuring conditions of wind turbines are comprised in a typical wind turbine.

According to the present invention, all components described in this figure constitute examples of sub-elements of a wind turbine.

Figure 3:
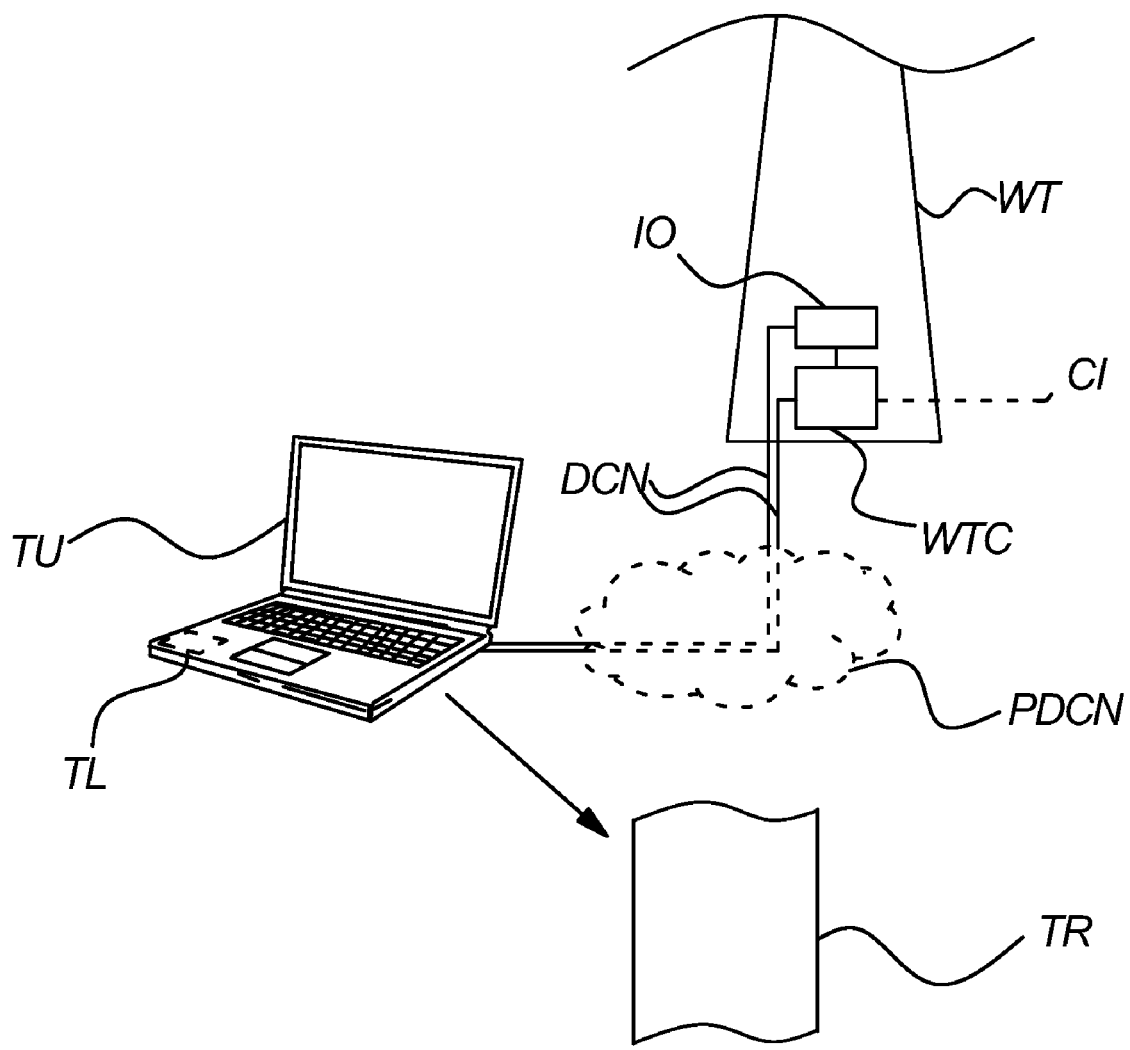
FIG. 3 illustrates one embodiment of a set-up according to the present invention.

FIG. 3 illustrates one embodiment of a set-up according to the present invention.

It should be noted that the set-up of this figure constitutes only a non-limiting example of a possible set-up according to the invention.

The figure comprises a test unit TU comprising test logic TL, a wind turbine WT, an I/O module IO, a wind turbine controller WTC, a communication interface CI, a data communication network DCN, a public data communication network PDCN and test results TR.

The wind turbine may have a wind turbine controller WTC which may be located inside or outside the wind turbine WT. This wind turbine controller WTC is referring to the control mechanism of the wind turbine WT. A wind turbine may further comprise one or more I/O modules IO available for interfacing of communication. The I/O module may be directly connected to the sub-elements of the wind turbine to be tested. Further, the wind turbine may comprise one or several communication interfaces CI, which normally are used for monitoring and control purposes. One communication interface CI may e.g. be a web interface for communication via the HTTP protocol (Hyper Text Transfer Protocol), another may communicate via OPC (OLE (Object Linking and Embedding) for Process Control) or another may communicate data described in a manufacturer proprietary protocol.

The test unit TU may be a personal computer, laptop, server or any other device comprising any kind of digital logic, e.g. a CPU (central processing unit) or DSP (digital signal processor). The test unit may be coupled to the wind turbine via a data communication network DCN. This network may e.g. constitute any cabling or wireless communication network communicating data, e.g. LAN (local area network) serial or parallel cabling, wireless or a connection via a public data communication network PDCN, e.g. the internet. This way, the test unit TU may be connected to the wind turbine both locally but also and preferably remotely. The test unit may be connected to the wind turbine controller WTC or directly to the I/O module IO of the wind turbine. The connection may go through one of the communication interfaces CI of the wind turbine. The test logic of the unit TU executes the test algorithms to be run at least partly or in cooperation with the logic of the wind turbine controller.

Alternatively, the test unit TU may be connected to a central control unit of a group of wind turbines, e.g. in a SCADA network.

Alternatively, the test unit TU may be comprised by a wind turbine controller of a wind turbine. This means that the wind turbine controller WTC may shift between executing a control algorithm under normal operation, and a test algorithm under test operation according to an embodiment of the invention. Thus, the test algorithm is overriding the control algorithm when a test is performed.

The test unit TU may when connected to a wind turbine comprise test control logic that makes the wind turbine WT perform one or several tests on the basis of execution of scripts comprising test algorithms. In a test the scripts executes a predefined event pattern which comprises executing a number of events in the wind turbine both by affecting the sub-element to be tested, but it may also affect other sub-elements. An affect on a sub-element may e.g. be the start of a motor, or the opening of a valve. A test may further comprise one or several measurements of one or several sub-elements to obtain measure data MD, e.g. the reading of a thermometer, an ampere meter, a pressure meter, etc. After performing the measurements, the measure data (MD) and reference data (NRD) are correlated to determine if the sub-element is functioning optimally without errors, if the sub-element is defect or if the sub-element is working, but is outside the normal scope, i.e. will maybe soon be defect. These data may be written in a test result TR. The reference data NRD are data obtained on the basis of average measurements made on faultless wind turbines.

The test result TR will thus indicate the condition of the tested sub-element.

In the following figures, two specific examples of practicing embodiments of the present invention are illustrated. It should be noted these examples merely constitute non-limiting examples of possible ways of practicing the invention.

Figure 4:
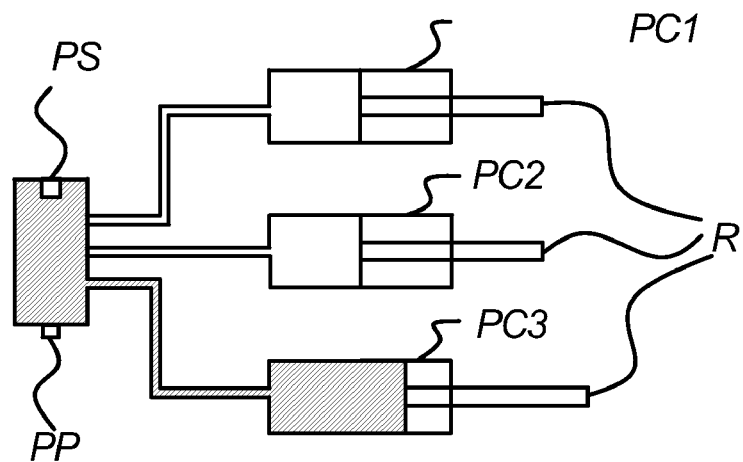
FIG. 4 illustrates a simplified overview of a pitch control system.

FIG. 4 illustrates a simplified overview of a pitch control system of a wind turbine. The figure illustrates a pressure pump PP, a pressure sensor PS and three pitch cylinders PC1, PC2, PC3. The pitch cylinders PC1, PC2, PC3 move rams R to pitch a blade of the wind turbine.

Figure 5:
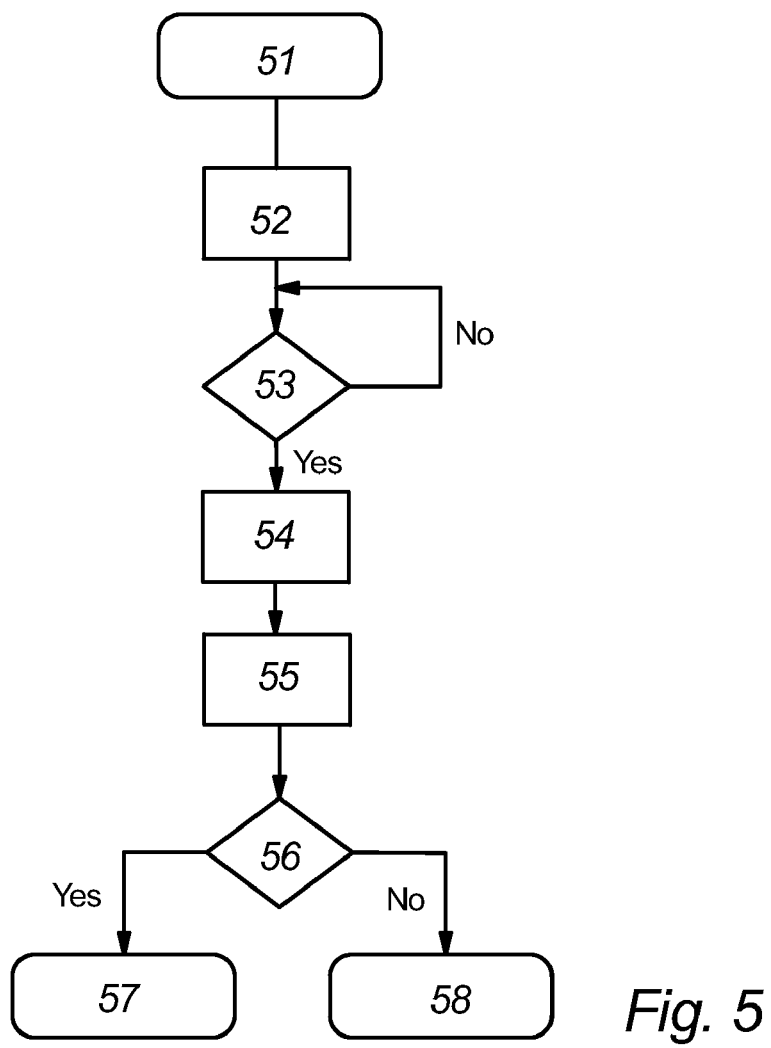
FIG. 5 illustrates a flowchart of a simplified example of performing a functional test according to the invention.

FIG. 5 illustrates a flowchart of a simplified example of performing a functional test of a pitch cylinder while being embedded in the wind turbine. This is an example of executing a predefined event pattern PEP according the present invention.

The test is initiated in step 51. This may be done by the test unit TU typically manually performed in connection with functional testing a wind turbine. In step 52 the pressure pump PP is started to increase the pressure in one of the pitch cylinders, in the illustrated example, the Pitch Cylinder 3 PC3. The ram of the cylinder will move and the pressure rises inside the Pitch cylinder 3 PC3. In step 53 the pressure is measured by means of a pressure sensor PS and the pressure pump is stopped in step 54 when the pressure reaches a predefined threshold (e.g. 200 bar). Subsequently there is a break in step 55 for a predefined period of time, after which the pressure is measured again by the pressure sensor PS. If the pressure in step 56 is above a predefined fault level (e.g. 190 bar), the tested cylinder PC3 is OK in step 57, and if the pressure is below the predefined fault level, the tested cylinder PC3 has a defect. Subsequently, a test result, e.g. "Pitch cylinder OK" may be shown at the test unit TU.

Thus, a pitch cylinder of a wind turbine is tested in a very simple and advantageous manner according to an embodiment of the invention.

It should be noted that this is not an exact description of how to perform the functional test of the present invention, but merely a very simplified and rhetorical example of how to perform a functional test according to an embodiment of the present invention.

Figure 6:
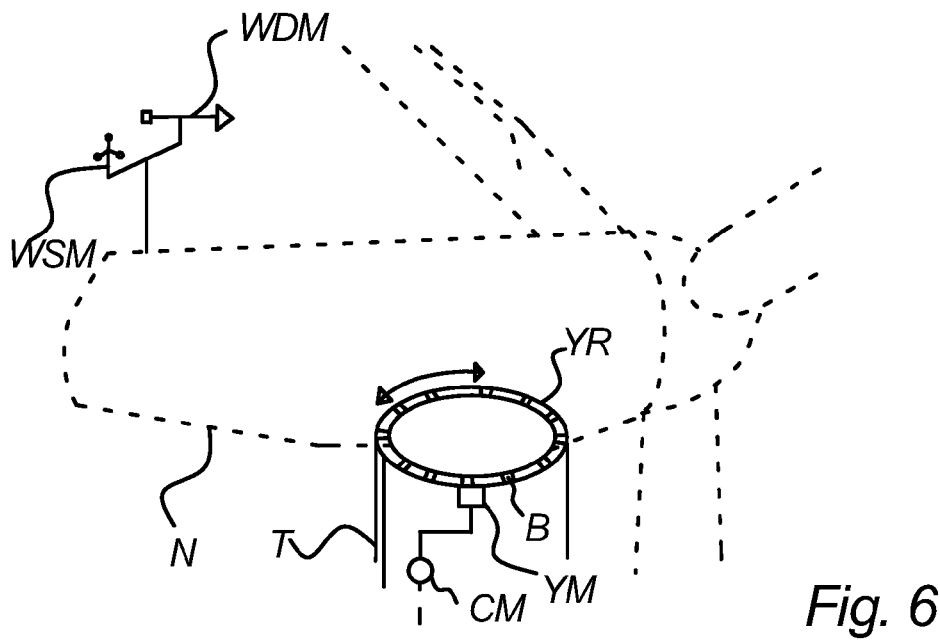
FIG. 6 illustrates a simplified overview of a yaw mechanism.

FIG. 6 illustrates a simplified overview of a yaw system of a wind turbine. The figure illustrates a tower T of a wind turbine, a nacelle N, a wind speed measuring unit WSM, a wind direction measuring unit WDM, a yaw ring YR, a number of bearings B, a yaw motor YM and a current measuring unit CM. A yaw system is used to maximize the amount of power the wind turbine can generate. This system turns the nacelle N by means of starting the yaw motor YR in reference to the actual wind direction given by the wind direction measuring unit WDM so that the span of the rotor is perpendicular with the direction of the wind. When the wind direction measuring unit senses a change in the wind direction it may cause the wind turbine controller WTC to activate the yaw system until the rotor is in the optimum position.

Figure 7:
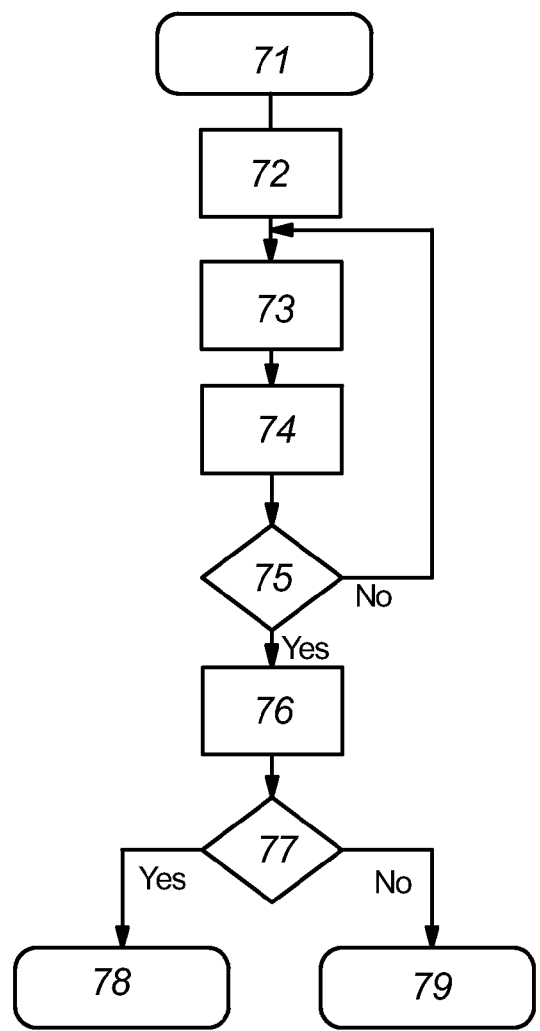
FIG. 7 illustrates a flowchart of a simplified example of performing a functional test according to the invention.

FIG. 7 illustrates a flowchart of a simplified example of performing a functional test of a yaw system while being embedded in the wind turbine. This is an example of executing a predefined event pattern PEP according the present invention.

The test is initiated in step 71. This may be done by the test unit TU typically manually performed in connection with functional testing a wind turbine. In step 72 a yaw motor YM is started to make the nacelle turn by means of making the yaw ring YR turn. In step 73, the current of the yaw motor YM is measured by means of a current measuring unit CM and the wind speed, the wind direction and other relevant factors are measured in step 74. Subsequently, the yaw motor YM stops 76 if the nacelle has turned e.g. 90 degrees 75. If not, the yaw motor YM continues to turn the nacelle N. In step 77 it is checked whether the measured current is above a predefined reference parameter. This reference parameter is calculated on the basis of measurements of an equivalent yaw system with allowance for a number of factors influencing the energy consumption of the yaw system, e.g. the wind speed or wind direction. If the measured consumed current is above the predefined reference parameter, the yaw system has a defect because too much energy is consumed to make the nacelle N turn the 90 degrees. This may e.g. be a defect bearing B, the tension mechanism may be defect or the yaw ring needs lubrication, and the test result will indicate that the yaw system has a defect. If the consumed energy is below the predetermined reference parameter 77, the yaw system is functioning correctly 79, and the test result will indicate that the yaw system is functioning correctly according to the turning facilities YR. If the consumed energy is below the predetermined reference parameter, the tested yaw system has a defect 78, and this may e.g. be defect bearings, defect tension mechanism or lack of lubrication, etc.

Figure 8:
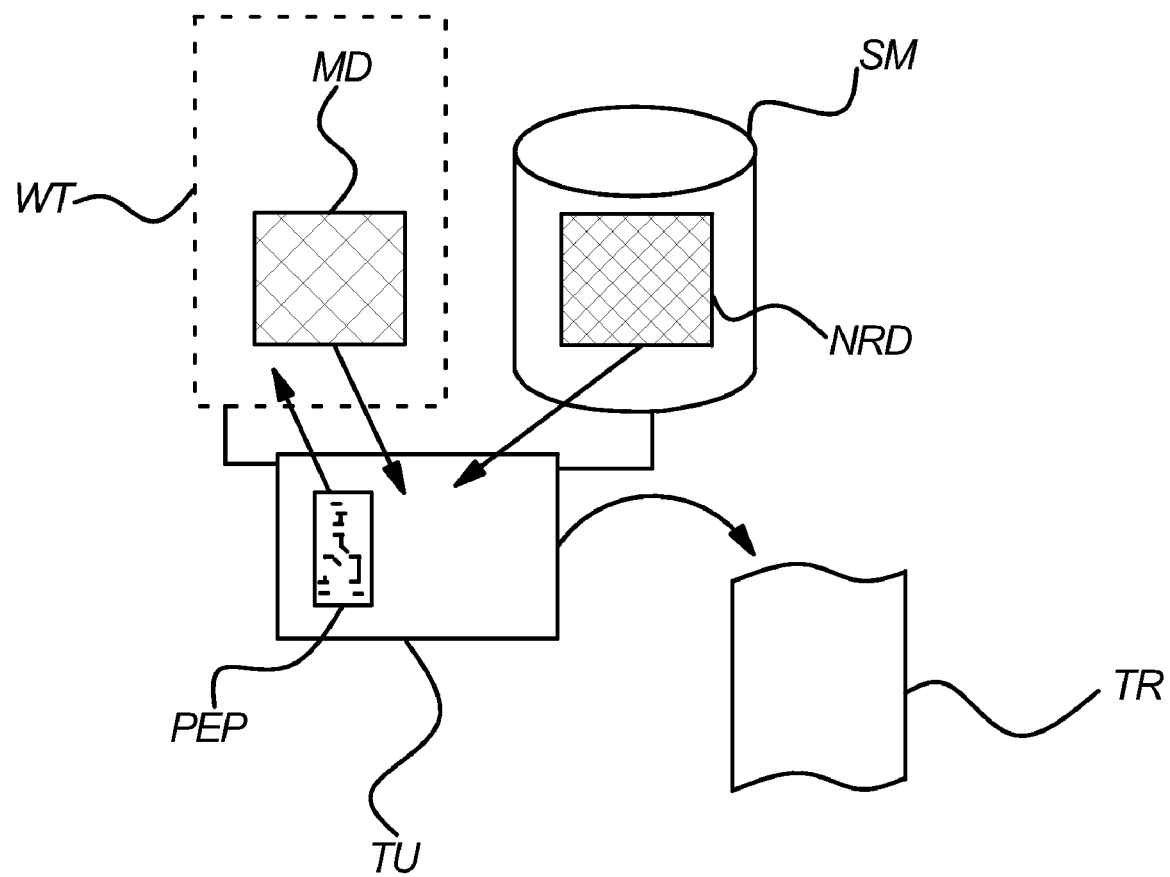
FIG. 8 illustrates the concepts of a functional test according to an embodiment of the present invention.

FIG. 8 illustrates the concepts of a functional test according to an embodiment of the present invention. The figure illustrates the following elements: a test unit TU, a predefined event pattern PEP, a wind turbine WT, measure data MD, storage means SM, reference data NRD and a test result TR.

This figure illustrates the concepts of performing a functional test according to an embodiment of the invention. The figure illustrates that a predefined event pattern PEP which is stored at a test unit TU or retrieved from storage means SM, is executed in a wind turbine which causes a number of events, e.g. sub-element to be affected. Furthermore, the figure illustrates that measure data MD is retrieved in the wind turbine WT from the test unit TU on the basis of measurements made of sub-elements as a part of the predefined event pattern PEP. The measure data MD obtained from the wind turbine are correlated with reference data NRD which are retrieved from storage means SM by the test unit. The data reference is at least partly established on the basis of measurements of normal error-free sub-elements of error free wind turbines WT and thus comprises data representing a normal and error-free sub-elements SE of a wind turbine WT. The storage means may be e.g. a database, hard disc, memory or a server, etc. By correlating measure data obtained from the wind turbine WT on the basis of a predefined event pattern PEP and the reference data. According to an embodiment of the invention, it is possible to determine the condition of the tested sub-element of the wind turbine WT and produce a test result TR comprising the result of the test. This test result may be text or graphic on a screen or monitor indicating the test result may be indicated by means of sounds or lights.

It should be noted that this figure illustrates a conceptual embodiment of the invention, which obviously means that the order or details are not to be understood limiting. This figure is merely indicating the overall and inventive concepts of an embodiment of the invention.

Figure 9:
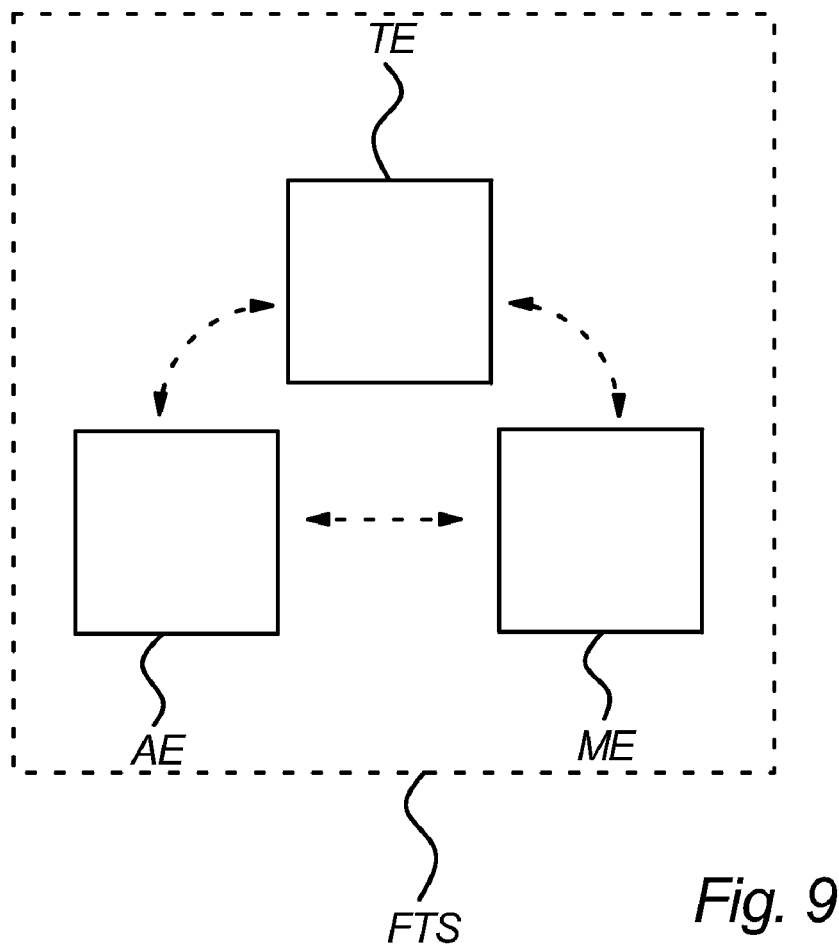
FIG. 9 illustrates a functional test spectrum according to an embodiment of the invention.

FIG. 9 illustrates some general and conceptual principles according to an embodiment of the invention and elements that may be related to a functional test according to an embodiment of the invention. This may e.g. be referred to as functional test spectrum FTS. The figure illustrates a group of test elements TE, a group of activation elements AE and a group of measuring elements ME. As it is illustrated by the dotted arrows the elements are connected according to performing a functional test. In a test according to an embodiment of the invention, the element that is tested is referred to as a test element TE. A complete test may comprise both one or more measurements and one or more activations. Elements to measure are hence referred to as measuring elements ME and the elements to activate are referred to as activation elements. It should be noted that one element or sub-element of a wind turbine may be both a test element TE, a measuring element ME and an activation element AE.

The test elements TE refer to the sub-element to be tested, e.g. the pitch system according to FIG. 4 or the yaw system according to FIG. 6. Other examples of test elements TE may be bearings, hydraulic system, hydraulic pumps, gear system sub components, generator, contactors, relays, oil pumps, motors, brake, pitch system, yaw system, grease pumps, etc.

The activation elements AE refer to sub-elements of a wind turbine that may be affected in connection with performing a functional test of a test element TE. Examples of activation elements AE may be: actuators, hydraulic pumps, heating element, blades, generator, contactors, relays, oil pumps, motors, brake, pitch system, yaw system, grease pumps, etc.

The measuring elements ME refer to sub-elements of a wind turbine that may be measured in connection with performing a functional test of a test element TE. Examples of measuring elements AE are: Thermometers, pressure meter, anemometer, voltage meters, current meters, speed meters, vibration sensors, oil flow sensors, particle sensors, strain sensors, impedance sensor, accelerators, etc.

As it appears in the above example, a single element or system may both be a test element TE, an activation element AE or even also a measuring element ME. This stresses the fact that this invention advantageously may utilize existing embedded mechanical and electrical elements to functional test other or even the same elements. For example a pump may in one functional test be tested as a test element TE and in another test act as an activation element AE to perform a test of another test element TE.

According to the above-mentioned examples, the invention may be applied in testing sub-elements of a wind turbine WT. It is within the scope of the invention that one test may comprise a batch of several functional tests of different sub-elements. This may typically be the case when testing large systems.

It should be noted that the activation elements AE and the measuring elements ME may be existing elements of a wind turbine. This is a very advantageous feature of the invention as in some circumstances no extra measuring or activation equipment needs to be installed to perform a functional test. It should though be noted that in alternative embodiments of the invention, it may be advantageous to add an extra measuring element ME when designing and creating the wind turbine elements having only the purpose of participating in a functional test. Thus, typically no extra measuring elements ME or activation elements AE needs to be mounted or installed to perform a functional test as the elements are already embedded. Evidently, in some extraordinary cases additional equipment may be mounted to perform a test.

Figure 10:
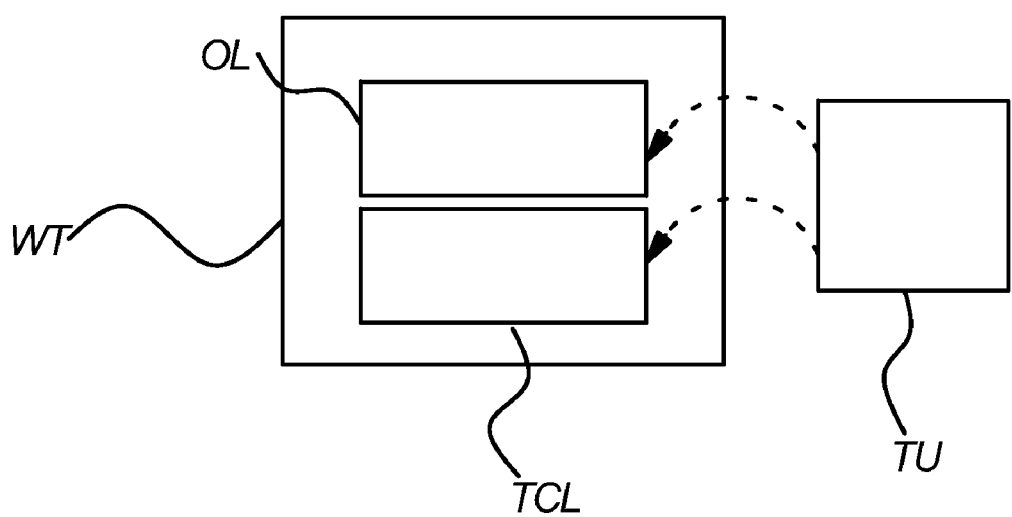
FIG. 10 illustrates the principles of using different control logic while performing a functional test according to an embodiment of the invention.

Another characterization of a preferred embodiment of the invention is that a functional test may be performed while the wind turbine WT is at least partly out of normal operation. This is the case due to the fact that the normal operation logic may be overridden by the test control logic comprised by the test unit TU. This is illustrated in FIG. 10.

According to an embodiment of the invention, the functional test is established on the basis of a controlled activation of activation elements AE which invoke specific situations that make it very advantageous to perform the test. The activation of elements being controlled means that the situations in which a functional test is performed is self-induced and is typically not part of a normal operation of the wind turbine. Thus, the activation and measurement of elements may be controlled by means of the functional test, which may be performed by the test unit TU.

A number of simple further examples of performing a functional test according to an embodiment of the present invention is described in the following by using the terms of FIG. 9 AE: activation element, ME: measuring element and TE: test element.

Start an oil pump AE and measure flow of a flow meter ME, if flow is below a predefined limit the filter TE may be clogged.

Set the wind turbine disc brake TE and run generator AE as a motor, while measuring rounds per minute on the generator revolution counter ME. If possible for the generator to turn the disc brake, the brake needs service.

Set the wind turbine disc brake TE and run generator AE as a motor. Monitor the amount of current of an ampere meter ME of the generator used to make the rotor turn and evaluate if the current consumed is above a maximum limit.

Pitch a blade AE of a wind turbine and measure how fast it turns by a time meter ME. This way it is possible to evaluate whether pressure pump TE is performing properly based on the time it takes to go from full negative pitch angle to full positive pitch angle.

Run a pump AE or motor AE in the nacelle N. Use closest vibration sensor ME to listen for abnormalities in e.g. the gear ME, generator ME or other elements inside or outside the nacelle.

Turn on different heat elements AE+TE and look for increase in power consumption of a power meter ME. If no increase or too little increase, the heating element is broken or damaged.

The last example constitutes an example of sub-element SE of a wind turbine WT being both an activation element AE and a test element TE which is within the scope of the invention.

FIG. 10 illustrates the principles of using different control logic while performing a functional test according to an embodiment of the invention. The figure illustrates the principles of how the test unit TU may choose between utilizing the normal operation logic OL of the wind turbine, typically comprised in the wind turbine controller WTC or utilizing a test control logic TCL. When performing a functional test according to an embodiment of the invention, it is possible to utilize the operation logic OL of the wind turbine, a test control logic TCL which may be defined in the test unit TU, or a combination thereof which is illustrated by the dotted arrows. It should though be noted that parts of the normal operation logic OL of the wind turbine WT may still be active while performing functional test according to an embodiment of the invention.

Figure 11:
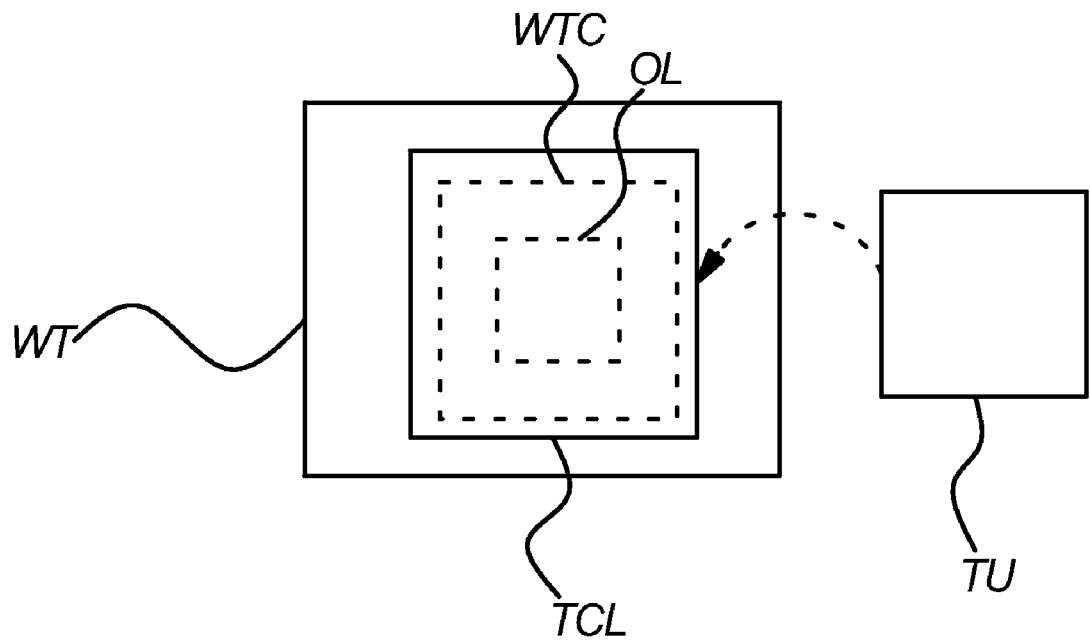
FIG. 11 illustrates another aspect of the principles of how the test control logic may override the operation logic of the wind turbine controller.

FIG. 11 illustrates another aspect on the principles of how the test control logic TCL may override the operation logic OL of the wind turbine controller. When performing a functional test according to an embodiment of the invention, the operation logic OL of the wind turbine, primarily comprised in the wind turbine controller may be override by the test control logic TCL of the test unit TU. The figure illustrates that when applying a test unit TU to a wind turbine, either local or remote the test control logic TCL of the test unit TU overrides the operation logic OL of the wind turbine controller WTC as illustrated by the operation logic OL box and the test control logic TCL box being dotted. It should though be noted that parts of the normal operation logic OL of the wind turbine WT may still be active while performing functional test according to an embodiment of the invention.

Figure 12:
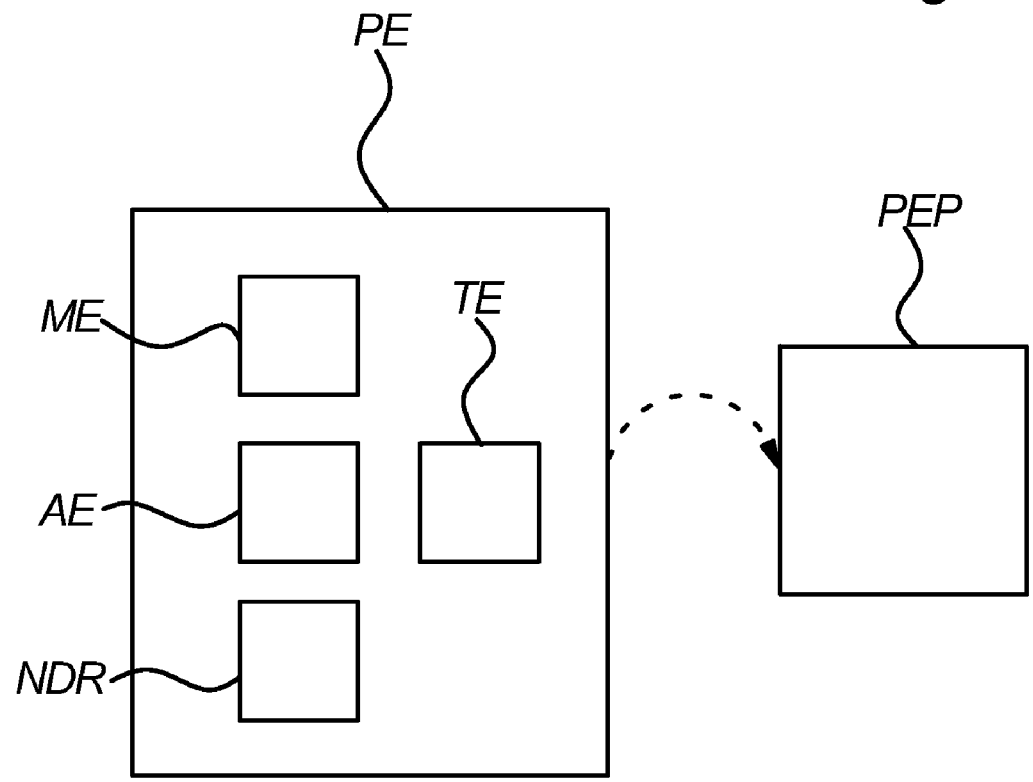
FIG. 12 illustrates an example of a predefined event pattern establisher.

FIG. 12 illustrates an example of a predefined event pattern establisher PE. According to an embodiment of the invention, it is possible to establish predefined event patterns PEP in several ways. The figure illustrates the general principles of establishing a predefined event pattern PEP. The establishment of a predefined event pattern may comprise the following elements: at least one measuring element ME, at least one activation element AE, reference data NRD, at least one test element TE and a predefined event pattern PEP. The figure illustrates that a user may select one or more measuring elements ME, one or more activation elements AE, one or more test elements TE and reference data and combine these to establish a predefined event pattern PEP. This may evidently be done in several ways by means of a GUI (Graphical User Interface) to e.g. drag and drop elements, or by means of hard coding the test in a programming language to establish a test program or a test algorithm to be executed e.g. on the test unit TU. The illustration is not to be understood limiting but is merely an overview of the typical elements comprised in a predefined event pattern establisher PE.

What is claimed is:

1. A method of performing a functional test of at least one embedded sub-element of a wind turbine,
said wind turbine being controlled by a control algorithm of a wind turbine controller,
said method comprising the steps of
executing a predefined event pattern activating at least one sub-element of the wind turbine;
obtaining measure data on the basis of measurements of at least one sub-element according to said predefined event pattern;
relating said measure data to predefined reference data; and
establishing a test result indicating a condition of said sub-element on the basis thereof,
wherein said predefined event pattern is executed by a test algorithm overriding the control algorithm of the wind turbine controller at least partly.

2. The method of performing a functional test according to claim 1, wherein said activating of at least one sub-element of the wind turbine involves activation of an activation element of the wind turbine.

3. The method of performing a functional test according to claim 1, wherein said functional test is performed remotely with respect to the wind turbine.

4. The method of performing a functional test according to claim 1, wherein said execution of a predefined event pattern comprises the execution of a predefined number of events in a predefined order.

5. The method of performing a functional test according to claim 1, wherein said predefined event pattern bypasses internal control logic related to the wind turbine.

6. The method of performing a functional test according to claim 1, further comprising overriding operation logic of said wind turbine at least partly.

7. The method of performing a functional test according to claim 1, wherein said executing of a predefined event pattern and said obtaining of measure data are performed simultaneously.

8. The method of performing a functional test according to claim 1, wherein said wind turbine under normal operation is controlled by a control algorithm and during functional test operation said wind turbine is at least partly controlled by a test algorithm according to said predefined event pattern.

9. The method of performing a functional test according to claim 1, wherein at least one activation element of said wind turbine is controlled by a test algorithm.

10. A system for performing a functional test of at least one embedded sub-element in a wind turbine,
    said wind turbine being controlled by a control algorithm of a wind turbine controller,
    said system comprising:
        at least one wind turbine comprising at least one activation element, and
        a test unit connected to said wind turbine via a data communication network,
        wherein the activation element is controlled by the control algorithm of the wind turbine controller and wherein the activation element is controlled by a test algorithm during a functional test.

11. The system for performing a functional test according to claim 10, wherein the control algorithm is at least partly overridden by said test algorithm while performing said functional test.

12. The system for performing a functional test according to claim 10, wherein at least one relevant activation element, measuring element or test element is out of normal operation while performing said functional test.

13. The system for performing a functional test according to claim 10, wherein said functional test is performed by a test unit, and said test unit is located at a remote distance from the wind turbine.

14. The system for performing a functional test according to claim 10,
    wherein said embedded sub-element comprises an actuator or a part of the wind turbine structure.

15. A method of establishing a predefined event pattern according to a functional test of at least one embedded sub-element of a wind turbine,
    said method comprising the steps of:
        selecting at least one test element to test;
        selecting at least one activation element;
        selecting at least one measuring element;
        selecting reference data; and
        establishing, by one or more computer processors, an event pattern comprising a specific sequence comprising:
            activating said at least one activation element,
            obtaining measure data according to measurements of said at least one measuring element, and
            correlating said measure data and said reference data to establish a test result.

* * * * *